Patented Apr. 25, 1933

1,905,304

UNITED STATES PATENT OFFICE

EDWARD J. PRANKE, OF BAYSIDE, NEW YORK

CYANIDE PROCESS

No Drawing.   Application filed November 29, 1929.   Serial No. 410,654.

This invention relates to processes of producing cyanides from crude calcium cyanamid, and has for its primary object to provide an improved and more efficient process for this purpose.

A number of proposals have heretofore been made for converting crude calcium cyanamid or lime-nitrogen into cyanides by fusing the said crude calcium cyanamid with salts of the alkali metals, for example, with sodium chloride, or with sodium carbonate. When the chlorid is used, however, the chlorid radicle remains in the product, diluting said product and making difficult, if not practically infeasible, the separation of the cyanide from the chlorids, and therefore rendering the preparation of substantially pure cyanide extremely difficult, if not practically impossible in large scale production operations. When the carbonate is used, on the other hand, the oxygen contained in the radicle appears to have a destructive action on the cyanide at the temperature necessary for efficient conversion to cyanide. Moreover, the calcium cyanamid may be decomposed, with loss of free nitrogen, before a high enough temperature is attained to give a high efficiency of conversion to cyanide.

I have discovered that crude calcium cyanamid or lime-nitrogen is readily converted to a cyanide compound by heating it in contact with elementary alkali metal, for example, sodium. It is well known that commercial crude calcium cyanamid contains free carbon slightly in excess of the amount of carbon combined in the form of calcium cyanamid, $CaCN_2$. While I am not certain of the exact form of the cyanide compound produced by my process I believe it to be the cyanide of the alkali metal. For example, the reaction between sodium and crude calcium cyanamid may be written as follows:

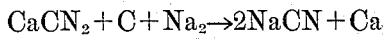

$$CaCN_2 + C + Na_2 \rightarrow 2NaCN + Ca$$

In carrying out the process I prefer to proceed as follows: I provide 23 pounds of sodium for every 14 pounds of nitrogen present in the crude calcium cyanamid, cutting the sodium into small pieces, which are mixed or intermingled with the crude calcium cyanamid and placed in a crucible, which is then heated to somewhat above a red heat, or to heat the charge to above 878° C. and preferably to about 1000° C. or even to a higher temperature, so that the charge will be heated to somewhat above a red heat. Since sodium boils at about 878° C. a slightly higher temperature will cause the sodium vapor to permeate the mass of the charge uniformly and thereby facilitate substantially complete and uniform reaction, which I have found to be substantially accomplished in a few minutes. The product, after cooling, may be removed from the crucible and used as it is, or the crude mass may be cooled and thereafter extracted with a suitable solvent of sodium cyanide, for example liquid anhydrous ammonia, and the cyanide recovered from the solution in substantially pure form, for example, by evaporating the solvent.

It is seen, therefore, that I obtain the desired cyanide compound without introducing any unnecessary radicles and therefore, have the cyanide in relatively high concentration and in a form which is very easily extracted and recovered as pure cyanide.

It is evident that the above process may be used with any suitable apparatus and may be practiced as a continuous operation by employing apparatus suitable to this purpose, as, for example, a heated rotary cylinder slightly inclined from the horizontal, a well known construction for continuous treatment of materials.

In place of the solid alkali metal, the molten metal, or the metal in vapor form may be used and, if necessary or convenient, mixed with an inert gas, such as carbon monoxid and/or nitrogen, it being understood however, that whether the alkali metal be used in solid form comminuted or cut into small pieces and intermingled or mixed, preferably uniformly, throughout the body of the crude calcium cyanamid, or in molten or vapor form, the crude calcium cyanamid is heated to above a red heat.

The sodium vapor, for example, may be conducted by any suitable means from the apparatus in which it is generated directly into the apparatus containing the heated crude calcium cyanamid.

In case the sodium, or other elementary alkali metal, be not mixed or intermingled with the crude calcium cyanamid in solid form, some means for agitating the cyanamid or causing movement thereof or therein during the reaction with the alkali metal vapor whereby the latter will substantially uniformly permeate all parts of, and react with all parts of, the heated crude calcium cyanamid should preferably be provided in order to obtain the greatest degree of efficiency. Such means may be a rotary cylinder as mentioned constantly rotated while the reaction is being carried out. However, any other means or method accomplishing such agitation or movement may be employed.

A primary consideration of the invention is that the body of heated crude calcium cyanamid shall be as thoroughly, and preferably as uniformly as practicable, permeated with the vapors of the elementary alkali metal as possible during the period of reaction. This may be accomplished either by mixing or intermingling the elementary alkali metal, cut into small particles or comminuted, in, and as nearly uniformly as practicable throughout all portions of, the body of crude calcium cyanamid, and then introducing this mixture as a charge into the apparatus, or by introducing the crude calcium cyanamid and the elementary alkali metal vapors separately into a common container and so regulating conditions therein that the vapor will thoroughly and uniformly permeate the body of crude calcium cyanamid, or by the rate and manner or method of feeding into, or through, said container the cyanamid with relation to the pressure of the elementary alkali metal vapors therein, or in a number of other ways.

Obviously, potassium, or any other alkali metal may be used in place of sodium.

By "crude calcium cyanamid" is meant the ordinary calcium cyanamid produced by the nitrification of calcium carbide with free nitrogen. While I prefer to use unhydrated, unoiled, crude calcium cyanamid because of the higher efficiency obtained, I have also obtained good yields with badly weathered crude calcium cyanamid by the above described process.

Having thus described my invention, what I claim as new and desire to secure by Letters Patent is:

1. The process of producing cyanide which comprises intermingling elementary alkali metal with crude calcium cyanamid and heating the mixture above a red heat.

2. The process of producing cyanide which comprises intermingling small particles of elementary alkali metal with crude calcium cyanamid and heating the mixture to above a red heat.

3. The process of producing sodium cyanide which consists in intermingling elementary sodium with crude calcium cyanamid, heating the mixture to above a red heat, cooling, extracting sodium cyanide with a suitable solvent, and removing the solvent from the contained sodium cyanide.

4. The process of producing cyanide which comprises subjecting crude calcium cyanamid in a heated condition above a red heat to elementary sodium vapors.

5. The process of producing cyanide which consists in heating crude calcium cyanamid above a red heat, subjecting the same at such temperature to an elementary alkali metal vapor, cooling the charge, extracting the cyanide from said charge with a suitable solvent, and removing the solvent from the contained cyanide.

6. The process of producing cyanide which comprises heating crude calcium cyanamid above a red heat and substantially uniformly permeating the same at such temperature with elementary alkali metal vapors.

7. The process of producing cyanide which comprises intermingling elementary sodium with calcium cyanamid and carbon and heating the mixture above a red heat.

8. The process of producing cyanide which consists in heating crude calcium cyanamid to a temperature above a red heat, intermingling the heated cyanamid with elementary sodium, cooling the product, extracting the cyanide therefrom with liquid anhydrous ammonia and separating the extracted cyanide from the ammonia solvent.

9. The process of producing crude sodium cyanide which consists in heating crude calcium cyanamid in the presence of sodium to above 900° C. according to the reaction $Ca CN_2 + C + 2Na = 2NaCN + Ca$, and cooling.

10. The process of producing crude sodium cyanide which consists in agitating crude calcium cyanamid in the presence of gaseous sodium at a temperature above 900° C. forming sodium cyanide according to the reaction $Ca CN_2 + C + 2Na = 2NaCN + Ca$, and cooling.

In testimony whereof, I have signed my name to this specification at Bayside, Long Island, New York, this 27th day of November 1929.

EDWARD J. PRANKE.